United States Patent
Shah et al.

(10) Patent No.: US 7,136,768 B1
(45) Date of Patent: Nov. 14, 2006

(54) METHOD AND SYSTEM FOR RELIABILITY ANALYSIS OF DISK DRIVE FAILURES

(75) Inventors: Sandeep Shah, Sunnyvale, CA (US); Jon G. Elerath, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 11/095,249

(22) Filed: Mar. 31, 2005

(51) Int. Cl.
    *G06F 19/00* (2006.01)
(52) U.S. Cl. ............... 702/115; 702/182; 702/183; 702/184; 702/185; 702/186; 702/187; 702/188
(58) Field of Classification Search ............... 702/115, 702/182–188; 707/3–5
    See application file for complete search history.

(56) References Cited

U.S. PATENT DOCUMENTS

| | | | |
|---|---|---|---|
| 6,735,549 B1 * | 5/2004 | Ridolfo ............... | 702/181 |
| 6,934,673 B1 * | 8/2005 | Alvarez et al. ............... | 703/21 |
| 2003/0204788 A1 * | 10/2003 | Smith ............... | 714/47 |
| 2005/0149570 A1 * | 7/2005 | Sasaki et al. ............... | 707/104.1 |

OTHER PUBLICATIONS

The International Disk Drive Equipment and Materials Association (IDEMA). Document No. R2-98: "Specification of Hard Disk Reliability", 1998, pp. 1-20.
Jon G. Elerath and Sandeep Shah, "Disk Drive Reliability Case Study: Dependence Upon Head Fly-Heigh And Quantity of Heads", Annual Reliability and Maintainability Symposium, Proceedings, Jan. 27-30, 2003. Document No. 2003RM-207, pp. 1-5.
Sandeep Shah and Jon G. Elerath, "Disk Drive Vintage and Its Effects on Reliability", Annual Reliabitliy and Maintainability Symposium, Proceedings, Jan. 26-29, 2004.
Jon G. Elerath and Sandeep Shah, "Server Class Disk Drives: How Reliable Are They?", Annual Reliability and Maintainability Symposium, Proceedings, Jan. 26-29, 2004, Document No. 0-7803-8215-3.
Sandeep Shah and Jon G. Elerath, "Reliability Analysis of Disk Drive Failure Mechanisms" (Abstract), Apr. 15, 2004.
Sandeep Shah and Jon G. Elerath, "Reliability Analysis of Disk Drive Failure Mechanisms", Annual Reliability and Maintainability Symposium, Proceedings, Jan. 24-27, 2005.

* cited by examiner

*Primary Examiner*—Marc S. Hoff
*Assistant Examiner*—Phuong Huynh
(74) *Attorney, Agent, or Firm*—Cesari and McKenna, LLP

(57) ABSTRACT

A method and system for performing reliability analysis of disk drive failure mechanisms is provided. The information for performing the analysis is obtained in accordance with the invention from a database generated from identification information stored about individual drives, and drive families, that are deployed in the field. An error database stores error codes that are issued by a disk drive upon a particular event. These error codes are reported to a storage system administrator and recorded in the error database. The disk drive information and the error codes are mapped, and error codes are translated into failure mechanisms for a particular drive family. An analysis is performed whereby a hazard rate plot is provided for either all failure indicators or selected failure indicators or subpopulations for a particular drive family over a given time.

29 Claims, 9 Drawing Sheets

HAZARD RATE PLOT OF ALL FAILURE MECHANISMS
COMBINED OF DRIVE A

HAZARD RATE PLOT OF FAILURE MECHANISMS OF DRIVE A

METHOD AND SYSTEM FOR RELIABILITY ANALYSIS OF DISK DRIVE FAILURES

BACKGROUND OF THE INVENTION

1. Field of the Invention

This invention relates to networked data storage systems, and more particularly, to reliability analysis of failures in disk drives used in such systems.

2. Background Information

A storage system is a computer that provides storage service relating to the or ganization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

In the client/server model, the client may comprise an application executing on a computer that "connects" to the filer over a computer network, such as a point-to-point link, shared local area network, wide area network or virtual private network implemented over a public network, such as the Internet. NAS systems generally utilize filebased access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system (a storage operating system, as hereinafter defined) enables access to stored information using block-based access protocols over the "extended bus." In this context, the extended bus is typically embodied as Fibre Channel (FC) or Ethernet media (i.e., network) adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and placing of that storage on a network. However, the SAN storage system typically manages specifically assigned storage resources. Although storage can be grouped (or pooled) into zones (e.g., through conventional logical unit number or "lun" zoning, masking and management techniques), the storage devices are still pre-assigned by a user, (e.g., a storage system administrator, as defined hereinafter) to the storage system.

Thus, the file server, as used herein, may operate in any type of storage system configuration including a NAS arrangement, a SAN arrangement, or a hybrid storage system that incorporates both NAS and SAN aspects of storage.

A file server's access to disks is governed by an associated "storage operating system," which generally refers to the computer-executable code operable on a storage system that manages data access, and in the case of filers, implements file system semantics. In this sense, the NetApp® Data ONTAP™ operating system available from Network Appliance, Inc., of Sunnyvale, Calif. that implements the Write Anywhere File Layout (WAFL™) file system is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

The storage devices in a file server environment are typically disk drives organized as a disk array, wherein the term "disk" commonly described a self-contained rotating magnetic media storage devices. These include hard disk drives (HDD), direct access storage devices (DASD) or logical unit number (lun) storage devices. Disk storage is typically implemented as one or more storage "volumes" that comprise physical storage disks, defining an overall logical arrangement of storage space. As will be understood by those skilled in the art, the rotating magnetic media storage devices contain one or more disk platters that are accessed for read/write operations by a magnetic read/write head that is operated electromechanically by a mechanism that includes hardware such as motors, bearings and the like, as well as firmware and software, which provide supervisory instructions to the hardware mechanisms. This assembly as a whole is referred to herein as a "disk drive."

In a typical file server implementation, a plurality (e.g., hundreds) of individual disk drives are arrayed in a field installation to provide storage organized as a set of volumes or similar multi-drive arrangements. The disk drives are manufactured and shipped for use in NAS, SAN or hybrid environments. These storage environments incorporate multiple disk drives from the world's leading manufacturers into storage systems that are deployed in either a central location or which may be geographically dispersed. The entity that designs and implements the storage system is referred to herein as the "storage network provider." The customer who purchases the storage system from the storage network provider, and makes storage services available via a client/server model or otherwise through the storage system, whether it is in the NAS or SAN configuration, is referred to herein for simplicity as a "user." An individual entity that makes requests via the NAS or SAN in order to access data contained therein is referred to herein as a "client." Either the storage network provider, or the user, or both of these entities may from time to time provide overall supervision and maintenance (e.g., software updates, etc.) and may provide reliability analysis and other controls, as discussed herein, with respect to the storage system. That person or entity that is providing configuration, supervision, maintenance and/or reliability assistance for a storage system is referred to herein as a "storage system administrator."

As noted, the storage network providers order disk drives for a field installation from third party manufacturers. Thus, a field installation can contain disk drives from several different disk drive manufacturers. Moreover, disk drive manufacturers often create what are known as drive "families." Within a drive family, the drives are nearly identical, except for the number of disks and read/write heads. Drive families are used to maximize commonality between products thereby reducing design and manufacturing costs, while addressing the market's need for multiple capacity points such as 18 gigabytes (GB), 36 GB and 72 GB. Each family of drives typically goes through its own unique design and manufacturing process.

As also noted, each SAN or file server implementation incorporates a large field installation base including hundreds of disk drives for each drive family from each manufacturer. Given the large number of disk drives in a typical implementation, there is a reasonable likelihood that one or more disk drives will experience an operational problem that either degrades drive read-write performance or causes a drive failure. This is because disk drives are complex electromechanical systems. Sophisticated firmware and software are required for the drive to operate with other components in the storage system. The drives further incorporate moving parts and magnetic heads which are sensitive to particulate contamination, and electrostatic discharge (ESD). There can be defects in the media, rotational vibration effects, failures relating to the motors and bearings, and other hardware components or connections. Some problems arise with respect to drive firmware or drive circuitry. Environmental factors such as temperature and altitude can also affect the performance of the disk drive.

Thus, drives can fail and the failure can be significant if there is a nonperformance of the drive. Therefore, it is important for a storage system administrator to understand the mechanisms by which disk drive errors occur, especially those errors that could ultimately result in a drive failure. To that end, error information such as error codes may be useful in determining whether there are any conclusions to be drawn about a particular drive family from a particular drive manufacturer so that the manufacturer can be notified of performance issues that arise in the field.

However, even though most disk drives incorporate an error code reporting capability, simply recording error codes does not provide enough information to fully evaluate the underlying reason for the error code having been generated. Error codes are typically reported by an individual drive, and global studies of drive families by SCSI error codes have not been available.

In the past, reliability analysis has been confined to predicting the time at which a predetermined percentage of components can be expected to have failed. This utilizes field failure data and combines such data to predict the probability of failure in a particular device over time. These studies are typically top level analyses which statistically predict a failure rate of a particular type of drive or a drive family, and have not been directed to specific underlying symptoms or causes. More specifically, error codes usually identify a physical symptom of an error, such as a loose connection or an open circuit. This symptom is known as a "failure mode." The underlying cause of the symptom, such as the physics that results in the failure may be a phenomenon such as "corrosion," (in that corrosion can lead to an incomplete or loose wire connection, etc.). This is known as a "failure mechanism." Studies have not been available which evaluate failure modes and failure mechanisms and how these may change during the operating life of a disk drive, or in a family of disk drives.

Studies have been performed which compute either an annual or an annualized failure rate, which is a rolling three month average that assumes a constant failure rate for all drives. This type of study further assumes that the probability of failure is equally likely in any fixed period of time. This, however, is rarely true as set forth in IDEMA Standards, "Specification of Hard Disk Drive Reliability," document number R2-98. This procedure does not account for the changing failure rate nature of disk drives and the fact that some failure mechanisms contribute to failure rates at one point in the life of a drive, whereas other failure mechanisms dominate at subsequent points in the operation of a drive.

In addition, there is typically no mapping of error codes to specific failure mechanisms for specific drive families. Thus, the typical top level analysis does not provide an accurate picture of the overall rates of change of failure mechanisms over time for drive families.

There remains a need, therefore, for an improved method of performing reliability analysis of disk drive failures that can take into account how different failure modes and/or failure mechanisms can contribute to an overall failure rate over the course of the life of disk drives. There remains a further need for a method of reliability analysis which can be focused on a particular drive family from particular third party manufacturers so that failure mechanisms that frequently occur with respect to that drive family can be identified and addressed.

SUMMARY OF THE INVENTION

This invention overcomes the disadvantages of the prior art by providing a method and system for reliability analysis of disk drive failures which calculates rates of change of failures to provide information about disk drives and disk drive families that can be interpreted and utilized by storage system administrators and disk drive manufacturers in order to improve disk drive reliability.

More specifically, the method includes generating a reliability database for disk drive families in a field installation, which incorporates a combination of information from several sources. The first source of information is obtained from a disk drive information database that is maintained by a storage system administrator about each individual disk drive that is installed in the field. For every drive shipped, this database tracks, inter alia, the serial number of the disk drive, the disk drive family, the date of shipment, and the date of any return by the customer. Another source of information is an error code database, which stores records of each error code generated for each disk drive component in the field installation, which has an auto support feature, as discussed further herein, turned on. The error codes reflect "failure modes" (i.e., symptoms as described above) occurring in the disk drives. In addition, the storage system administrator in accordance with the invention gathers detailed information unique to each disk drive manufacturer that indicates the specific cause, i.e., the failure mechanism that results in an error code being generated.

More specifically, in accordance with the invention, when an error code is generated by a disk drive, the error code is reported to the storage system administrator. The error code report includes the disk drive serial number, the error code and the specific date and time of the error occurrence. All this information is recorded in the error code database, which is maintained by the storage system administrator.

A reliability analysis utility of the storage system administrator uses the disk drive serial number to retrieve the information about that disk drive, such as the shipment date of the disk drive, the disk drive family to which it belongs, from the disk drive information database. Information about error codes generated by that disk drive is then retrieved from the error code database. This information from the error code database and the disk drive information database is then joined by the serial number of the disk drives and recorded in the reliability database maintained by the storage system administrator. The reliability analysis utility then cooperates with the error code database information to determine the specific failure mechanism that gave rise to the error code. As noted, the failure mechanism information is also recorded in the reliability database, and is then mapped to the disk drive and disk drive family on which the error was reported. The above information is continuously gathered for subsequent analysis in order to identify trends and patterns in disk drive failures in the field installation.

The subsequent analysis is performed on the error codes, the failure modes associated with the error codes, or the underlying failure mechanisms, or a combination of one or more of these items. The error codes, failure modes, and failure mechanisms are herein referred to generally as "failure indicators," such that when the term "failure indicator" is used herein, it shall include error codes, failure modes, and/or failure mechanisms, individually or any combination thereof.

Using the information recorded in the reliability database, a reliability analysis is performed in accordance with a further aspect of the invention. A first level of reliability analysis involves a study of the overall failure rate for all failure indicators combined for a particular disk drive family. This is performed by obtaining all reported error codes during a given time period for a particular disk drive family. A statistical analysis is performed to determine the hazard rate for all failure indicators reported for a particular drive family over a selected time period. If it is determined that a particular drive family experiences increasing or decreasing rates of a particular failure indicator being reported, then a more detailed study is performed. In this more detailed study, each individual type of failure indicator, be it a particular error code, a particular failure mode, or an error code, individual failure mechanism, or a combination thereof, is plotted separately.

For example, knowing the mapping between each error code and its corresponding failure mechanism, it can be determined from the individual plots when and how a particular failure indicator contributes to an overall failure rate for a given drive family. Using this data, the risk of failure can be assessed and it can be further determined whether any steps should be taken to contact the manufacturer about an ongoing problem, to take corrective actions, or to change certain aspects of system operation to avoid the problem in the future.

In accordance with a further aspect of the invention, certain categories of devices within disk drive families can be apportioned into subpopulations to be studied separately. For example, drives of a particular capacity can be separated out and the failure indicators reported for such drives can be retrieved from the reliability database, and these subpopulations can be evaluated separately, for a more detailed risk assessment and analysis of the drives operating under different circumstances. The analysis of the present invention can be extended to study the impact of disk drive firmware and operating system software versions on the failure indicators by segregating the disk drive population and error codes reported by drives operating on a particular firmware or a software version and plotting the hazard rate of the failure indicators in that instance. Thus, a subpopulation can be created for disk drives that have undergone changes or upgrades in firmware, for example. Or, a subpopulation can be created based upon drives that have undergone upgrades or changes in operating system software, as another example.

BRIEF DESCRIPTION OF THE DRAWINGS

The above and further advantages of the invention may be better understood by referring to the following description in conjunction with the accompanying drawings, in which like reference numerals indicate identical or functionally similar elements.

DETAILED DESCRIPTION OF AN ILLUSTRATIVE EMBODIMENT

1. System Environment

Figure 1:
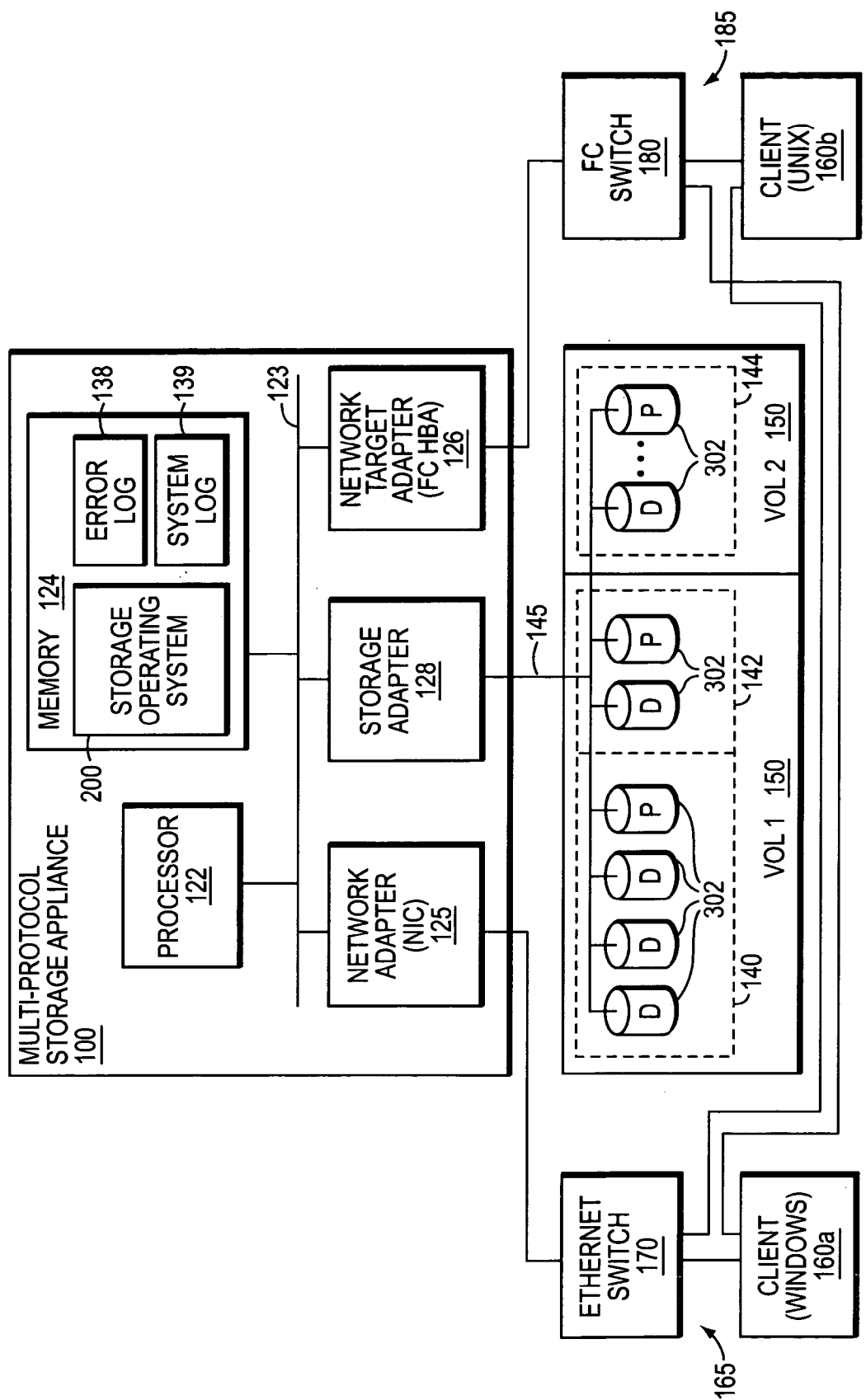
FIG. 1 is a schematic block diagram of the network environment including a multiprotocol storage appliance and disk drive array with which the present invention may be advantageously employed.

FIG. 1 is a schematic block diagram of a multi-protocol storage appliance (MPSA) 100 that may be advantageously used with the present invention. The MPSA is configured to provide storage service for both file and block protocol access to information stored on storage devices in an integrated manner. In this context, the integrated multiprotocol appliance denotes a computer having features such as simplicity of storage service management and ease of storage reconfiguration, including reusable storage space, for users (storage system administrators) and clients of network attached storage (NAS) and storage area network (SAN) deployments.

The MPSA 100 is illustratively embodied as a storage system comprising a processor 122, a memory 124, a plurality of network adapters 125, 126 and a storage adapter 128 interconnected by a system bus 123. The MPSA 100 also includes a storage operating system 200 that includes a virtualization system including a file system to logically organize the information as a hierarchical structure of named directory, file and virtual disk (vdisk) storage objects on disk drives 302. An example of a MPSA that may be advantageously used with the present invention is described in co-pending and commonly assigned U.S. Patent Application Publication No. 2004/0030668 A1, filed on Aug. 9, 2002, titled A Multi-Protocol Storage Appliance that Provides Integrated Support for File and Block Access Protocols, which application is hereby incorporated by reference as though fully set forth herein.

Whereas clients of a NAS-based network environment have a storage viewpoint of files, the clients of a SAN-based network environment have a storage viewpoint of blocks or disks. To that end, the MPSA 100 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The MPSA thereafter makes these emulated disks accessible to the SAN clients through controlled exports, as described further herein.

In the illustrative embodiment, the memory 124 comprises storage locations that are addressable by the processor and adapters for storing software program code and data structures, the latter containing information passed between disk drives and the network during normal runtime operations. An example of such a data structure is an error log 138 that is configured to store error codes that are reported by the disk drives, as described further herein. A system log 139 (sometimes referred to as "syslog") is also maintained in the memory 124 and may contain a backup set of error codes as well as other system information such as date, time, and other aspects of system operation.

The processor and adapters may comprise processing elements and/or logic circuitry configured to execute the software code and manipulate the data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the invention described herein.

The network adapter 125 couples the storage appliance 100 to a plurality of clients 160a,b over point-to-point links, wide area networks, virtual private networks implemented over a public network (Internet) or a shared local area network, hereinafter referred to as an illustrative Ethernet network 165. For a NAS-based network environment, the clients are configured to access information stored on the multi-protocol appliance as files. Therefore, the network adapter 125 may comprise a network interface card (NIC) having the mechanical, electrical and signaling circuitry needed to connect the appliance to a network switch, such as a conventional Ethernet switch 170. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 160 may request the services of the storage appliance 100 by issuing file access protocol messages (in the form of packets) to the appliance over the network 165. For example, a client 160a running the Windows operating system may communicate with the storage appliance 100 using the Common Internet File System (CIFS) protocol over TCP/IP. On the other hand, a client 160b running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated MPSA using other file access protocols.

The storage network "target" adapter 126 also couples the MPSA 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA offloads fiber channel network processing operations for the storage appliance.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as the disk drives 302, to attach to the storage appliance 100. In SCSI terminology, clients 160 operating in a SAN environment are initiators that initiate requests and commands for data. The MPSA is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The MPSA 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 185 to access information stored on the disks. It will be apparent to those skilled in the art that the clients may also request the services of the integrated MPSA using other block access protocols. By supporting a plurality of block access protocols, the MPSA provides a unified and coherent access solution to vdisks/luns in a heterogeneous SAN environment.

The storage adapter 128 cooperates with the storage operating system 200 executing on the storage appliance to access information requested by the clients. The information may be stored in the disk drives 302 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1–2 150) that comprise a cluster of physical storage disk drives 302, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume 150 is constructed from an array of physical disk drives 302 that are organized as RAID groups 140, 142, and 144. The physical disks of each RAID group include those disks configured to store striped data (D) and those configured to store parity (P) for the data, in accordance with an illustrative RAID 4 level configuration. However, other RAID level configurations (e.g. RAID 5) are also contemplated. In the illustrative embodiment, a minimum of one parity disk and one data disk may be employed. However, a typical implementation may include three data and one parity disk per RAID group and at least one RAID group per volume.

To facilitate access to the disk drives 302, the storage operating system 200 implements a write-anywhere file system that cooperates with virtualization modules to provide a system that "virtualizes" the storage space provided by the disk drives 302. The file system logically organizes the information as a hierarchical structure of named directory and file objects (hereinafter "directories" and "files") on the disks. Each "ondisk" file may be implemented as set of disk blocks configured to store information, such as data, whereas the directory may be implemented as a specially formatted file in which names and links to other files and directories are stored. The virtualization system, which is described more fully with reference to FIG. 2, allows the file system to further logically organize information as a hierarchical structure of named vdisks on the disks, thereby providing an integrated NAS and SAN appliance approach to storage by enabling filebased (NAS) access to the files and directories, while further enabling block-based (SAN) access to the vdisks on a file-based storage platform.

As noted, in the illustrative embodiment, the storage operating system is preferably the NetApp® Data ONTAP™ operating system that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a MPSA, implement data access semantics, such as the Data ONTAP storage operating system. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or system.

2. Storage Operating System

Figure 2:
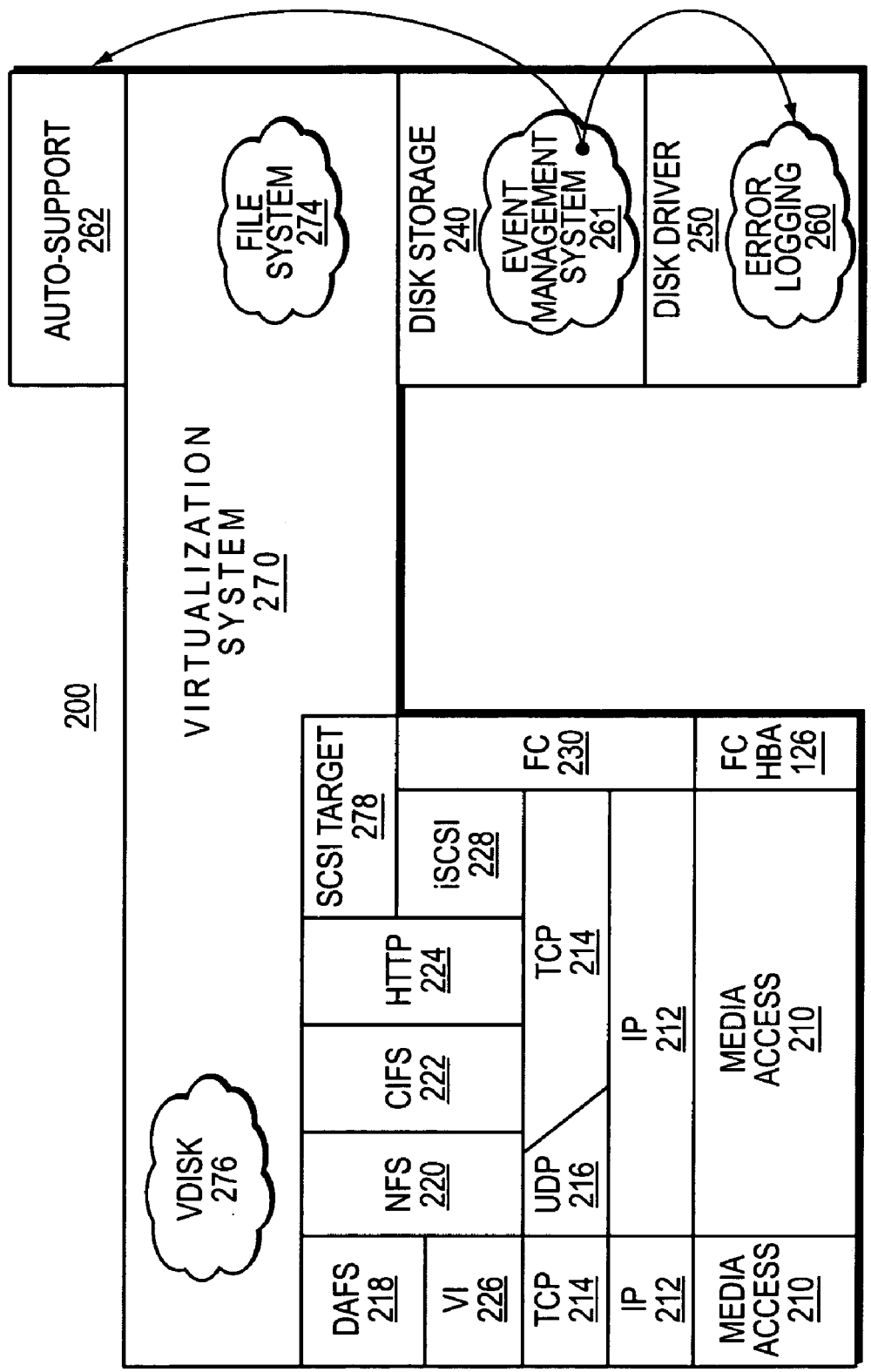
FIG. 2 is a schematic block diagram of an exemplary storage operating system for use with the exemplary multi-protocol storage appliance of FIG. 1 in accordance with an exemplary embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the MPSA using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the MPSA.

In addition, the storage operating system includes a disk storage layer 240 that implements a disk storage protocol, such as a RAID protocol, and a disk driver layer 250 that implements a disk access protocol such as, e.g., a SCSI protocol.

An Event Management System (EMS) 261 is a mechanism in the disk storage layer 240 that supports creation, forwarding and consumption of event indications. An error logging utility 260 functions in the disk driver layer 250 to receive error codes generated by the disks. In accordance with the invention, the receipt of an error code, for example, is an event that is identified by the EMS 261 and is thereafter recorded into the error log 138 in the memory 124 (FIG. 1). A back up of the error code may also be stored in the system log 139 in the memory 124 of FIG. 1. The error code event is sent by the EMS 261 to an auto-support daemon 262 residing in the storage operating system 200, and the auto-support daemon 262 is configured to report the error code by email or other appropriate notification technique, as described further herein.

Bridging the disk software layers with the integrated network protocol stack layers is a virtualization system 270. The virtualization system 270 includes a file system 274 interacting with virtualization modules illustratively embodied as, e.g., vdisk module 276 and SCSI target module 278. It should be noted that the vdisk module 276, the file system 274 and SCSI target module 278 can be implemented in software, hardware, firmware, or a combination thereof. The vdisk module 276 communicates with the file system 274 to enable access by administrative interfaces, in response to a storage system administrator issuing commands to the MPSA 100. In essence, the vdisk module 276 manages SAN deployments by, among other things, implementing a comprehensive set of vdisk (lun) commands issued by the storage system administrator. These vdisk commands are converted to primitive file system operations ("primitives") that interact with the file system 274 and the SCSI target module 278 to implement the vdisks.

The SCSI target module 278 initiates emulation of a disk or lun by providing a mapping procedure that translates luns into the special vdisk file types. The SCSI target module is illustratively disposed between the FC and iSCSI drivers 228, 230 and the file system 274 to thereby provide a translation layer of the virtualization system 270 between the SAN block (lun) space and the file system space, where luns are represented as vdisks 276. To that end, the SCSI target module 278 has a set of application programming interfaces that are based on the SCSI protocol and that enable a consistent interface to both the iSCSI and FCP drivers 228, 230. By "disposing" SAN virtualization over the file system 274, the MPSA reverses the approaches taken by prior systems to thereby provide a single unified storage platform for essentially all storage access protocols.

The file system 274 provides volume management capabilities for use in blockbased access to the information stored on the storage devices, such as disks. That is, in addition to providing file system semantics, such as naming of storage objects, the file system 274 provides functions normally associated with a volume manager. These functions include (i) aggregation of the disks, (ii) aggregation of storage bandwidth of the disks, and (iii) reliability guarantees, such as mirroring and/or parity (RAID), to thereby present one or more storage objects layered on the file system. A feature of the MPSA is the simplicity of use associated with these volume management capabilities, particularly when used in SAN deployments.

The file system 274 illustratively implements the WAFL file system having an on-disk format representation that is block-based using, e.g., 4 kilobyte (kB) blocks and using inodes to describe files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in commonly owned U.S. Pat. No. 5,819,292, titled Method for Maintaining Consistent States of a File System and for Creating User-Accessible Read-Only Copies of a File System by David Hitz et al., issued Oct. 6, 1998, which patent is hereby incorporated by reference as though fully set forth herein.

It should be understood that the teachings of this invention can be employed in a hybrid system that includes several types of different storage environments such as the particular storage environment 100 of FIG. 1. The invention can be used by a storage system administrator that deploys a system implementing and controlling a plurality of satellite storage environments that, in turn, deploy thousands of drives in multiple networks that are geographically dispersed. Thus, the term "storage system" as used herein, should, therefore, be taken broadly to include such arrangements.

3. Reliability Analysis.

Figure 3:
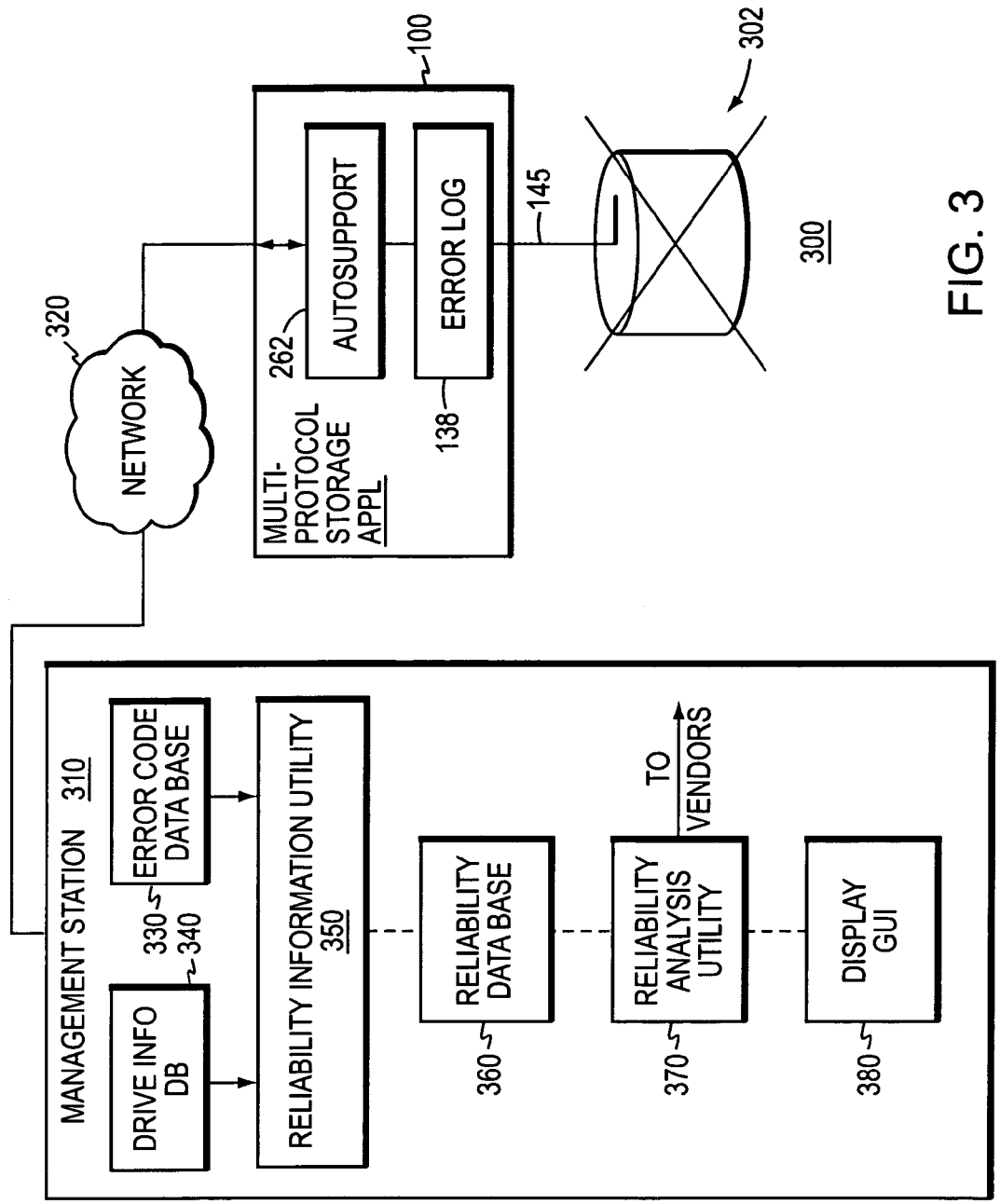
FIG. 3 is a schematic block diagram of the reliability analysis system according to an illustrative embodiment of the present invention.

The reliability analysis technique of the present invention can be implemented in a system 300 illustrated in FIG. 3, which typically includes many MPSAs, and/or filers or file systems. However, for purposes of clarity of illustration, one MPSA 100 is illustrated in FIG. 3. A storage system administrator operating a management station 310 has supervisory control over all of the storage appliances, such as the MPSA 100, in the storage area network environment. The MPSA 100 has associated therewith a storage disk drive 302. The disk drive 302 typically is coupled in an array as described with reference to FIG. 1 to the MPSA 100 by the storage adapter 128 via SCSI bus 145. When a disk drive does not perform properly, firmware executing in the disk drive 302 generates an error code, and sends it over the SCSI bus 145 to the error logging utility 260, which is noted as an event by the EMS 261 in the disk storage layer 250. The error code is then stored in the error log 138.

Either by messaging using conventional interfaces (IPC), communication techniques or by periodic polling (or by another method known to those skilled in the art), the auto-support daemon 262 executing in association with virtualization system 270 sends the error code to the management station 310, through a mail host coupled to a computer network 320. The network 320 may be the Internet, an intranet or other network on which the management station 310 may be configured as a node, or in any other suitable arrangement that interfaces the storage system administrator with the MPSAs, filers and other devices in the storage network. In the illustrative embodiment, the auto-support daemon 262 runs periodically, such as weekly or when triggered by the user or storage system administration and thus reports the error code to the storage system administrator by email over the network 320. As noted, however, other notification techniques may alternatively be employed as will be understood by those skilled in the art.

The error codes which are transmitted by the auto support daemon 262 to the management station 310 of the storage system administrator are then stored in an error code database 330, maintained by the storage system administrator. It is noted that in many implementations, the error code data base 330 may also contain additional information about errors occurring with respect to other components in the overall storage system as well as error codes regarding disk drive failures. But, this particular illustration relates to the error codes generated by the disk drives in the system.

These error codes follow the convention for reporting errors as defined by the SCSI standard. The SCSI standard prescribes the structure of the data and the command set for its retrieval. SCSI standard documents are available through the SCSI Trade Association of Presidio of San Francisco, Building 572-B Ruger St., San Francisco, Calif. USA.

By way of background, the structure of the SCSI standard as adapted for the disk drive implementation is to return one or more pairs of hexadecimal values. Some of the pairs are defined by the SCSI Standard, and others are left to the discretion of the disk drive manufacturer to define, depending upon the particular device involved. SCSI error codes may include a Sense Key, a Sense Code and a Sense Code Qualifier. The actual SCSI standards are adapted for various devices and applications with which they are used. Examples of Sense Keys are illustrated in the Table 1.

TABLE 1

Sense Key Codes and Descriptions

| SCSI Sense Key | Description |
|---|---|
| 01 | Recovered Error |
| 02 | Not ready |
| 03 | Medium error |
| 04 | Hardware error |
| 05 | Illegal request |
| 06 | Unit attention |
| 07 | Data protect |
| 08 | Blank check |
| 09 | Firmware error |
| 0B | Aborted command |
| 0C | Equal |
| 0D | Volume overflow |
| 0E | Miscompare |

For example, the SCSI Sense Key value 01 is indicative of a Recovered Error. The SCSI Sense Key value 05 indicates an Illegal Request. Additionally, Sense Codes and Sense Code Qualifiers are provided by the manufacturer of each disk drive. Several exemplary Sense Codes and Sense Code Qualifiers are shown by way of example in the Table 2.

TABLE 2

Example Error Codes and Descriptions

| 01 Recovered Error | Description |
|---|---|
| 01-17-01 | Recovered Data with Retries |
| 01-17-02 | Recovered Data using positive offset |
| 01-17-03 | Recovered Data using negative offset |
| 01-18-00 | Recovered Data with ECC (no retry attempted) |
| 01-18-01 | Recovered Data with ECC and retries applied |
| 01-18-02 | Recovered Data with ECC and/or retries, data auto reallocated |
| 01-18-06 | Recovered Data with ECC and offsets |
| 01-18-07 | Recovered Data with ECC and data rewritten |

For example the Sense Key value (01) for Recovered Error may have an additional Sense Code value (18) which denotes Recovered Data with Error Correcting Codes (ECC). As indicated in Table 2, the additional Sense Code Qualifier value (01) denotes "with retries applied." Some disk drive manufacturers provide an additional set of vendor-specific hexadecimal values (not shown). These can take the place of other, unused pairs, or can be in the form of a suffix, in which case they are known as Sense FRU suffix codes, which provide yet an additional layer of information about an error. Error codes generally describe failure modes. However, within a specific drive family from a disk drive manufacturer an error code is generally equivalent to a particular failure mechanism. Thus, a particular error code (with its vendor specific codes) provides both an error reporting function, as well as an explanation of the failure mechanism (or cause) leading to the error. A list of dominant failure mechanisms that often occur in disk drives is provided in the following Table 3:

TABLE 3

Disk Drive failure Mechanisms

| Corrosion | Media contamination |
|---|---|
| Thermal Erasure | Particle under head |
| Media Errors | T/A: Head hits bump |
| Corrosion | Media contamination |
| | Defect in media (embedded in mfgr.) |
| | High-fly writes |
| | Rotational vibration |
| | Hard particles ("loose") |
| | Head slaps (shock & vib.) |
| Head Instability (& Dead Head) | Repeated T/A's |
| | Head assymetry in mfgr. |
| | Many, long writes |
| | Hard particle contact |
| | ESD |
| Hardware Errors | Motors, bearings; design, mfgr. |
| | PWA: solder, connectors |
| Electrical Failures | PWA: DRAM, ICs |
| | PWA: Motor drivers. pre-amp. chip |

Acronyms:
T/A Thermal asperity
ESD Electrostatic Discharge
PWA Printed Wiring Assembly
DRAM Dynamic Random Access Memory
IC Integrated Circuit In accordance with the invention, the information about the vendor-specific failure mechanisms for each drive manufacturer is maintained in the storage system administrator's reliability database 360, as discussed further herein. As noted herein, the error codes, failure modes and failure mechanisms are referred to as failure indicators.

Another database 340 is maintained by the storage system administrator. More specifically, a disk drive information database 340 is built for the overall field installation base deployed by the storage system administrator. It should be noted that disk drive information database 340 includes a variety of modules each containing various types of information about different components and functions of the overall storage system, in addition to the information about the disk drives. However, with respect to the present invention, one or more modules of the database contain information about disk drives in the field installation. For purposes of clarity of illustration and simplicity, the whole database is referred to herein as the disk drive information database 340.

For example, for each disk drive shipped, the disk drive information database 340 includes a record containing the serial number, the disk drive family to which it belongs, the date of shipment, details about the drive specifications such as drive capacity, and the date of any return by the customer. Thus, the storage system administrator maintains in its management station 310 a database 340 of "identification information" by which each disk drive 302 is uniquely identified.

In accordance with the present invention, the information in the error code database 330 and the disk drive information database 340 are combined as follows. A reliability information utility 350 tracks each new incoming set of error codes in the error code database as reported by the auto support daemon 262 when an error code is generated by a disk drive 302. The error codes are parsed and stored in the associated error code database 330. More specifically, each error code is stored with the date the error occurred and the associated serial number of the disk drive. In addition, in accordance with the invention, the reliability information utility 350 also extracts the disk drive family, capacity, date of shipment, date of return, information from the disk drive information database 340. Using all of this information, the reliability information utility 350 performs a one-to-one mapping using a disk drive serial number, which is unique and common to both databases, and stores this information in the reliability database 360.

The failure mechanisms associated with each error code for each manufacturer have also been stored in the reliability database 360. As noted, the failure mechanism is available through decoding of the Sense Codes, additional Sense Code Qualifiers and Sense FRU codes as discussed with reference to Tables 1 through 3.

Once all of this information is stored in the reliability database 360, a reliability analysis utility 370 extracts information from the reliability database 360 to perform a reliability analysis in accordance with another aspect of the present invention. This is described further herein with reference to FIG. 4 and subsequent Figures. This information can then be displayed on an associated graphical user interface (GUI) 380 for further study by engineers and vendors to resolve issues. In addition, further information can be provided to vendors or manufacturers of disk drives who can then take steps to fix any individual failure mechanism.

Figure 4:
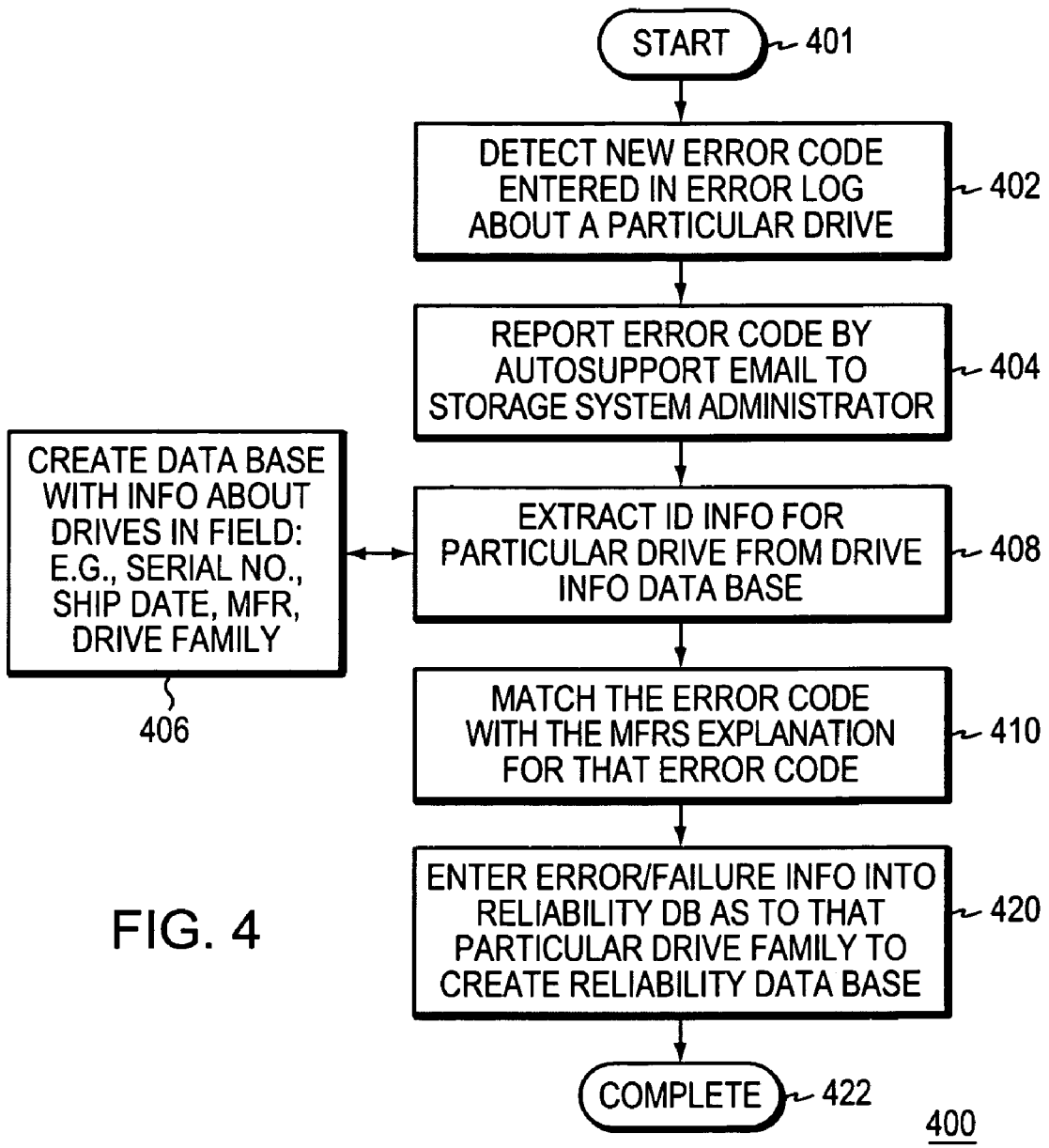
FIG. 4 is a flow chart illustrating a procedure for creating a reliability database in accordance with the present invention.

Referring to FIG. 4, a procedure 400 for creating the reliability database 360 in accordance with the present invention is described in further detail. The procedure 400 begins in step 401 and continues with step 402 where a new error code entered into the error log 138 at the MPSA 100, about a particular disk drive 302 is detected. Thereafter, this error code is reported by the auto support daemon 262, e.g., by email to the storage system administrator, as shown in step 404, or by another suitable means. Separately, a disk drive information database (340 FIG. 3) has been created with various kinds of information about the system as a whole, but the relevant aspect of the disk drive information database with respect to the present invention is that the disk drive information database contains detailed information about the disk drives that are installed in the field. The use of this associated database is illustrated in step 406, for the purpose of complete illustration.

In accordance with step 408, identification and ship date information for the particular disk drive which generated the error code is extracted using the drive serial number from the above described disk drive information database. Using the information from the disk drive information database 340 and the error code database 330, and information that is stored in the reliability database about failure mechanisms, the particular error code is mapped to the actual failure mechanism and the drive family involved as illustrated in step 410. Then, the error and failure mechanism information is entered into the reliability database about that particular disk drive family as illustrated in step 420 of FIG. 4, and the procedure is completed for that error code as indicated in step 422. It is noted that the procedure of FIG. 4 is one illustrative example of an embodiment of the invention as implemented. However, it should be understood this example is not limiting to the invention in that the various items of information may be stored in multiple storage devices, such as one or more different database implementations, or together in a single database or other storage implementation, and can be retrieved and matched in a different manner than illustrated in the example, while remaining within the scope of the present invention.

With the information that is stored in the reliability database, a complete failure analysis can be performed. More specifically, the failure analysis is performed using the procedure 500 illustrated in FIG. 5. The procedure 500 begins at step 501 and continues to step 510 in which a particular drive family from a particular manufacturer is selected for analysis. In step 520, all error codes of interest are retrieved from the reliability database 360 for that disk drive family, for a given time period. Using this information, one or more failure indicators are analyzed for that drive family. For example, each failure indicator can contribute to the overall failure rate of the disk drive in a different fashion at different times in the operating life of the disk drive. For example, one failure indicator may have a high but constant failure rate, while another failure indicator may have a low but increasing rate. Thus, in accordance with the invention, the reliability analysis utility 370 determines the rate of change of one or more failure indicators, as opposed to simply a failure rate over time.

Figure 6:
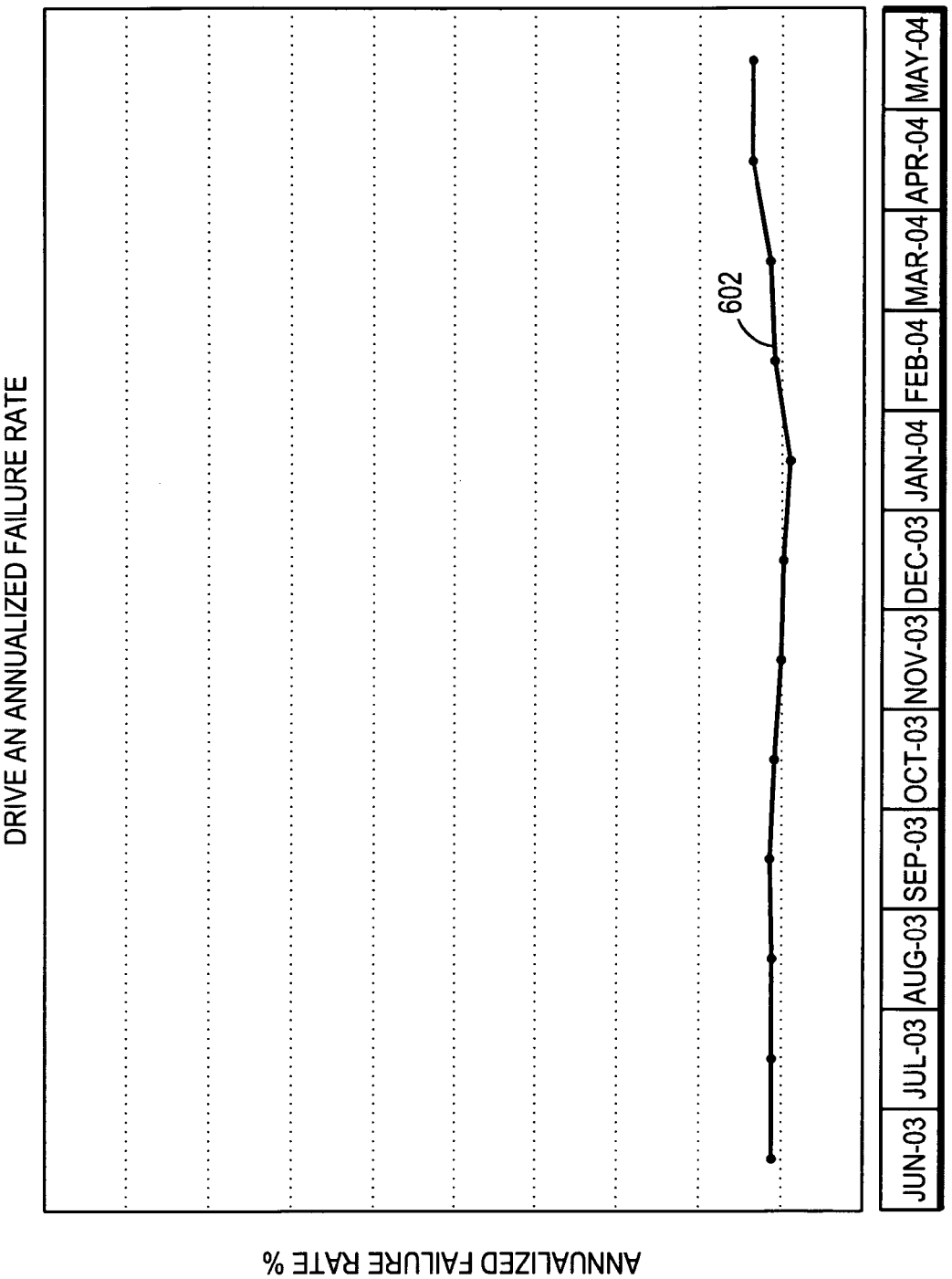
FIG. 6 is a prior art plot of annualized failure rate for a particular drive.

The problem with a simple failure rate over time plot can be better understood with reference to FIG. 6. Simply plotting the number of failures each year (annual failure rate) or over just one or more months and extrapolating this out to a one year plot (annualized) as shown by the curve 602, for example, appears to indicate a fairly constant failure rate over time. However, such a plot does not provide a full understanding of the reasons and the timing of key failure indicators, which contribute most to the overall failure rate of disk drives.

Figure 5:
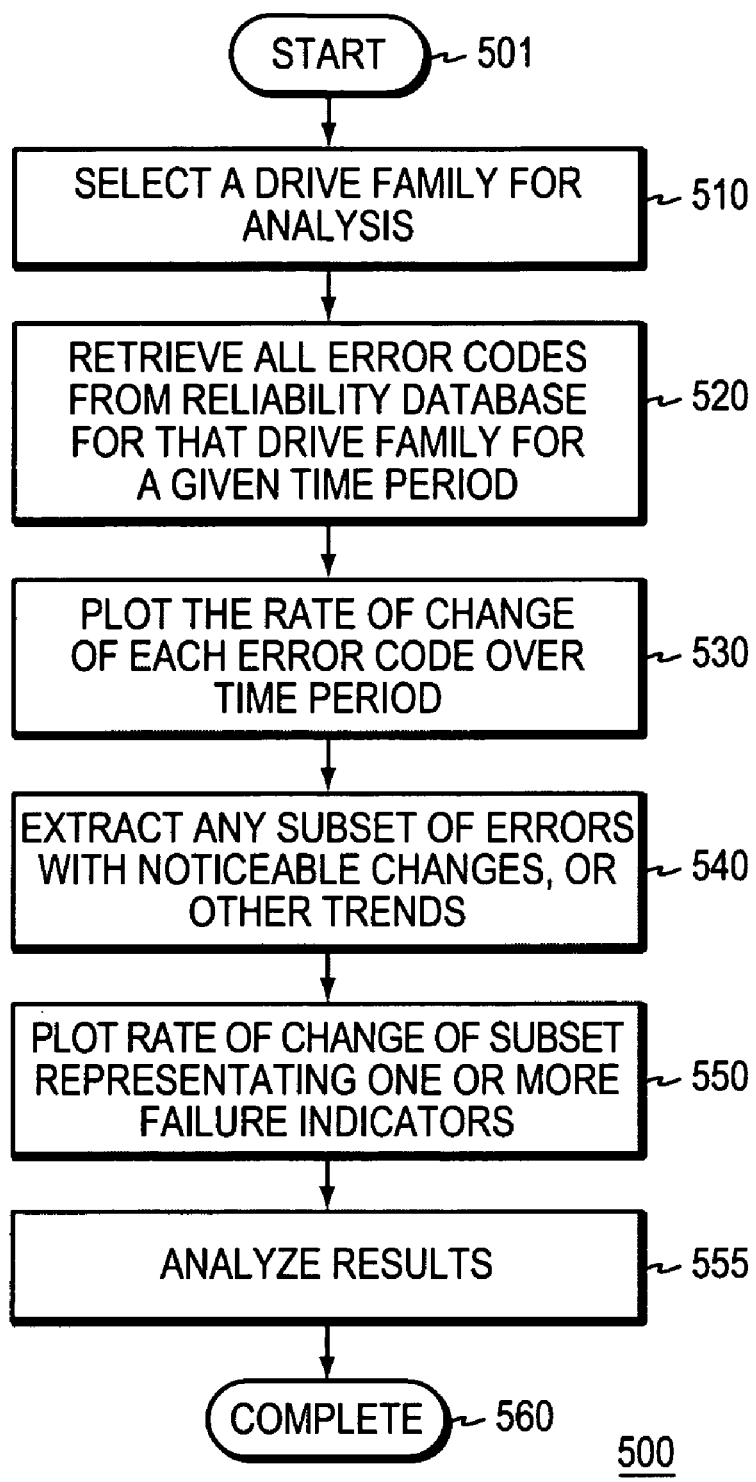
FIG. 5 is a flow chart illustrating a procedure for performing a reliability analysis in accordance with the present invention.

Thus, returning to the procedure 500 of FIG. 5, in accordance with the present invention as illustrated in step 530, the reliability analysis utility 370 plots the hazard rate, or the rate of change for each failure indicator being generated, over a specific time period.

More specifically, hazard rate is calculated using the following formula:

$$h(t) = \frac{f(t)}{R(t)}$$

where f(t) is the probability density function and R(t) is reliability as a function of time.

In accordance with the invention, a hazard rate plot of one or more failure indicators is generated. The plot may be a plot of error codes reported, or a plot of a combination of failure modes or failure mechanisms for a particular drive family. In the example of FIGS. 7 through 11, the hazard rate plots illustrated are plots of failure mechanisms. These plots are provided by way of example, and not by way of limitation, so that plots of any of the failure indicators or any combination thereof, is within the scope of the present invention.

Figure 7:
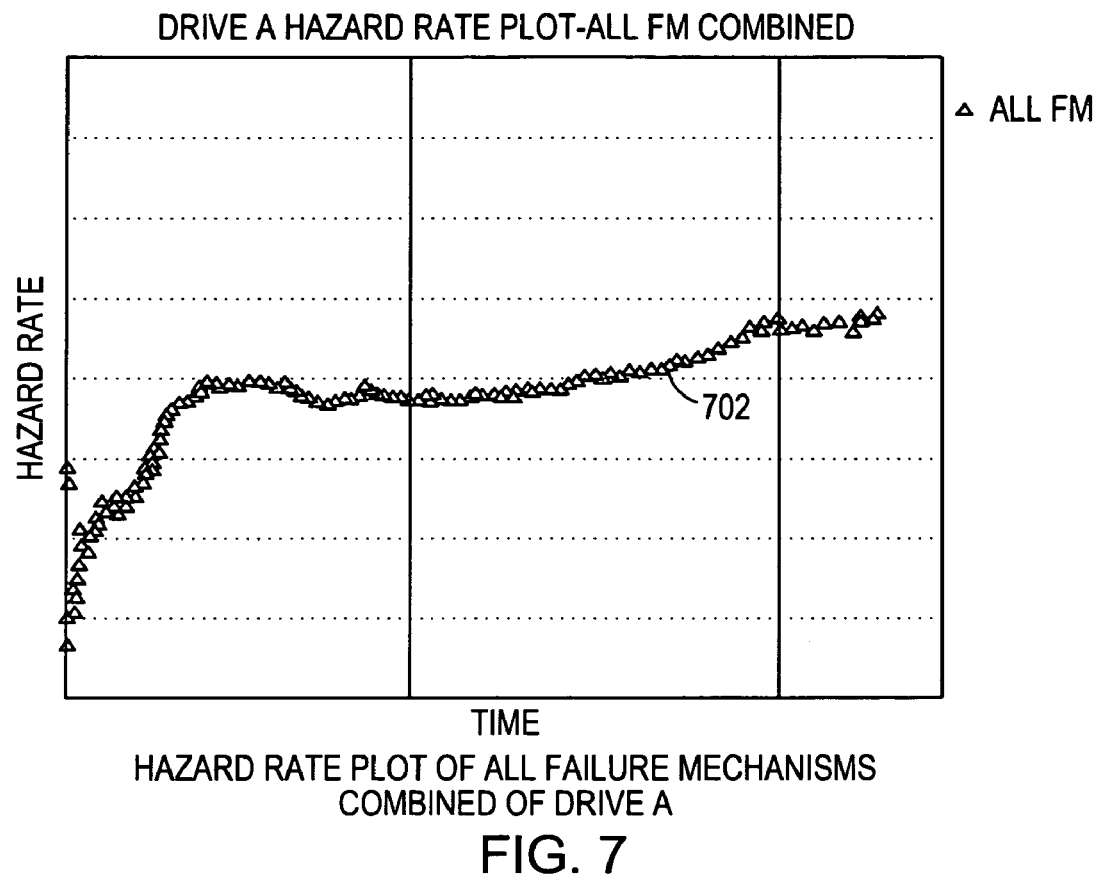
FIG. 7 is a plot of hazard rate over time of all failure mechanisms combined for a particular drive family.

By way of example, a hazard rate plot of failure mechanisms for a particular drive, referred to herein as drive A, is illustrated in FIG. 7. Hazard rate is plotted on the ordinate and time is plotted on the abscissa. The data are analyzed for fit to Weibull and Lognormal distributions using the Maximum Likelihood Estimates (MLE) method and goodness of fit tests, as will be understood by those skilled in the art. As these are not the only methods available to those skilled in the art, the present invention encompasses all other statistical distributions, curve fitting techniques and goodness of fit tests. Based upon the best fit of the data, a linear plot is made using known software techniques. The composite hazard rate of all failure mechanisms for "Drive A" is combined as shown by the curve 702. As will be seen from FIG. 7, the curve 702 shows an increasing hazard rate in the beginning of the plot, followed by a substantially constant rate, and then ending with a slightly increasing hazard rate. Thus, drive A seems to have at least three different failure mechanisms at work.

To better understand the cause of this changing failure rate the method of the present invention includes the step (540) of FIG. 5, which is to extract any subset of errors with noticeable changes or trends to thereby calculate a set of hazard rates for different failure mechanisms contributing to the overall hazard rate. These individual failure indicator hazard rates are then plotted individually in accordance with step 550, and as noted this may be a plot of error codes, failure modes, and/or failure mechanisms, or a combination thereof.

Figure 8:
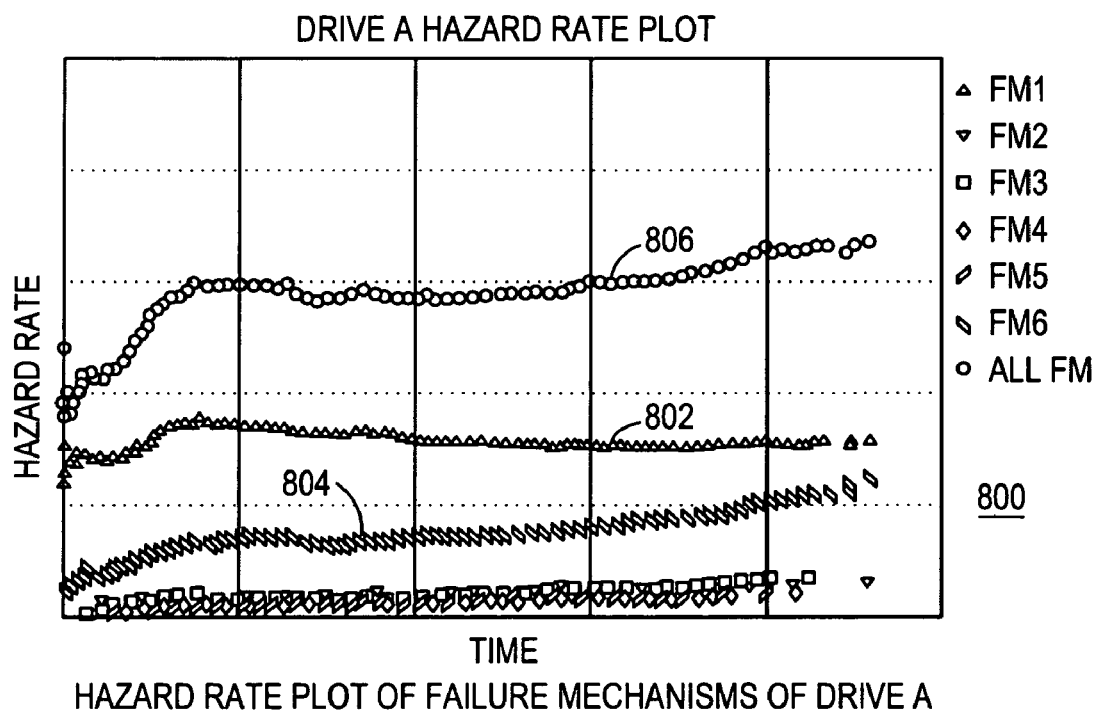
FIG. 8 is a set of hazard rate plots over time for individual failure mechanisms for the same drive family as plotted in FIG. 7.

This is illustrated in the plot 800 of FIG. 8 which plots hazard rate of each individual failure mechanism (FM1, FM2, FM3, FM4, FM5 and FM6) on the ordinate against time on the abscissa.

The hazard rate plot of failure mechanism "FM1" is illustrated, for example, by the curve 802. Note that the curve 802 is slightly increasing at the beginning and then decreasing. This failure mechanism is related to infant mortality failures caused by handling or particulate contamination, which dominates the early part of a drive's operating life, but then decreases as drive manufacturing processes mature. Failure mechanisms FM2, FM3, FM4 and FM5 are rather constant through the operating life of the drive. These represent random failures, which dominate during the useful life of the drive. Failure mechanism FM6 (which is represented by the curve 804) seems to have a gradually increasing hazard rate. In the early part drive's operating life, the overall hazard rate of all failure mechanisms combined 806 is dominated by the failure mechanism FM1 and then failure mechanism FM6 starts to dominate the overall hazard rate towards the latter part of the drive's operating life. Disk drives with failure mechanism FM6 can be identified and a corrective action plan can implemented, as will be understood by those skilled in the art, to mitigate the overall hazard rate of such drives in the field based on the information shown in the plot.

Referring again to FIG. 5, it should be appreciated that in accordance with the present invention, particular failure mechanisms, when studied separately, can allow a user, such as an engineer, analyzing this resulting data (step 555) to identify underlying causes (such as bearing failures, motor failures or other failures as described herein) and then notify the manufacturer of these problems so that corrective actions can be taken, such as altering design or manufacturing processes accordingly. The procedure 500 thereafter completes in step 560.

Figure 9:
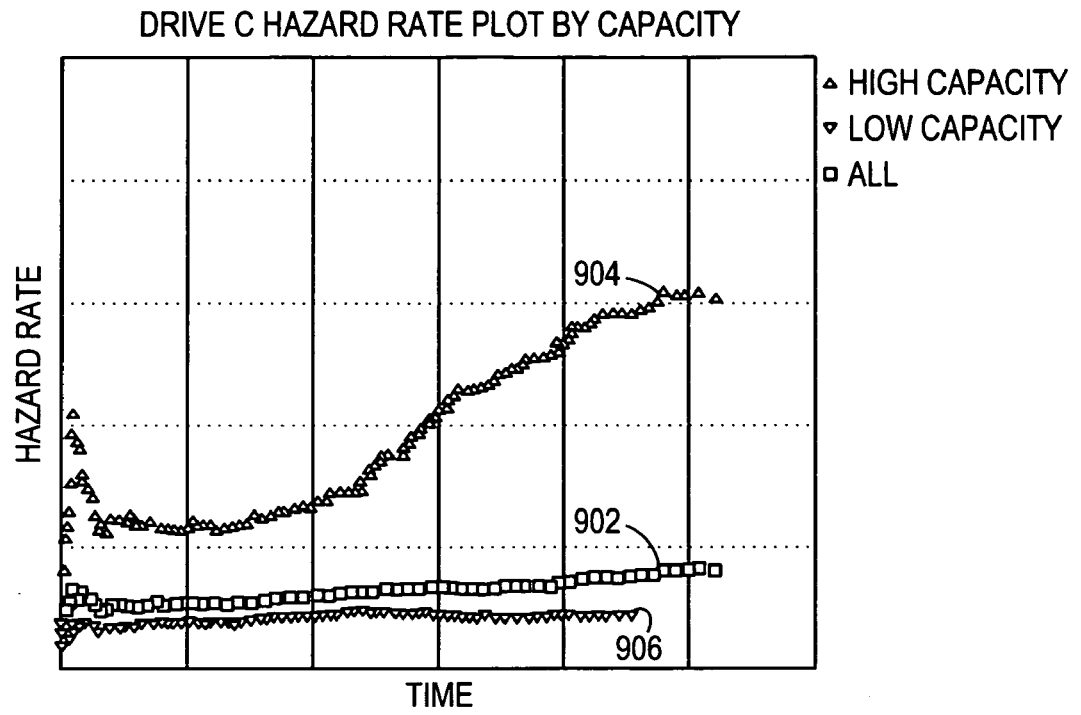
FIG. 9 is a set of hazard rate plots over time of failure mechanisms for drives of different capacities within a particular drive family.

In addition to the individual failure mechanisms, a drive family can be evaluated in other bases, such as usage or capacity, for example. More particularly, most disk drive families have different capacities, depending upon the number of read/write heads and disks. In accordance with this aspect of the invention, an analysis is performed on the effect of failure mechanisms that are dependent on the capacity of the drive. FIG. 9 is a hazard rate plot with hazard rate plotted on the ordinate and time on the abscissa of two capacities of drive family C. The overall hazard rate of all drive capacities is shown in curve 902 of FIG. 9. The hazard rate for high capacity drives is shown in the curve 904 and the low capacity hazard rate plot is the curve 906. The high capacity drives as shown in curve 904 seem to have an increasing hazard rate from the beginning, whereas the low capacity drives reflected in the curve 906 have a rather constant hazard rate. Therefore, the composite hazard rate of both low capacity and high capacity drives as illustrated by the curve 902 is gradually increasing.

Figure 10:
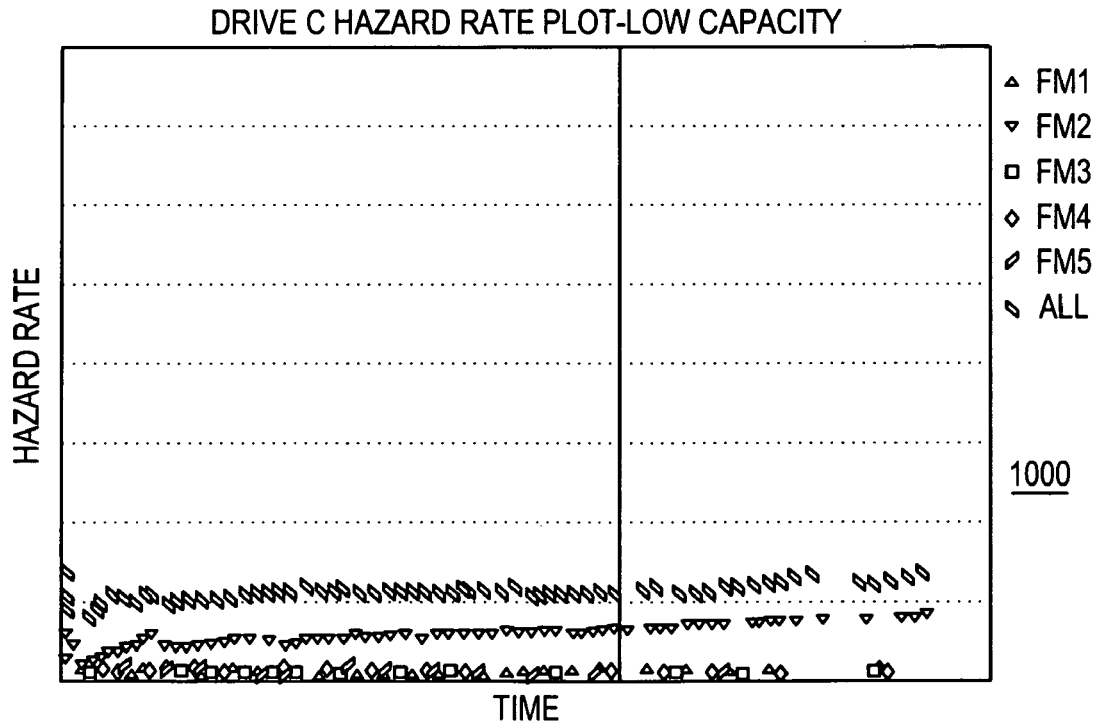
FIG. 10 is a set of hazard rate plots over time of failure mechanisms for each low capacity drive of the same family as in FIG. 9.

In accordance with the invention, to understand the difference in the hazard rates between the high and low capacity drives, hazard rate plots of the individual failure mechanisms are then plotted on separate plots. For example, FIG. 10 is a hazard rate plot of failure mechanisms of low capacity of drive C. As is illustrated in FIG. 10, all failure mechanisms seem to have a rather constant and low hazard rate so the composite hazard rate is also constant for low capacity drives as is visible from the plot 1000 of FIG. 10.

Figure 11:
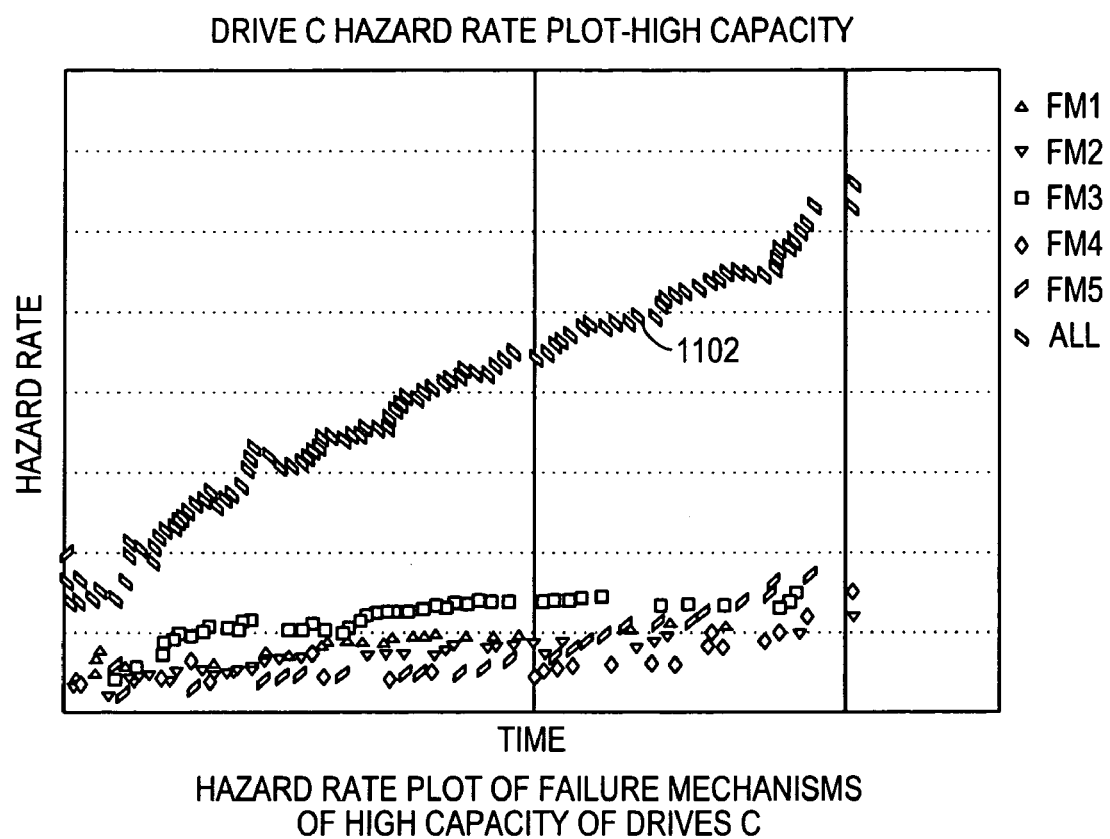
FIG. 11 is a set of hazard rate plots over time of failure mechanisms for each high capacity drive of the same family as in FIG. 9.

FIG. 11 is the hazard rate plot of different failure mechanisms of high capacity drives. All failure mechanisms (except failure mechanism FM2) have higher hazard rates compared to the low capacity drives. Additionally, the failure mechanisms FM4 and FM5 seem to have an increasing hazard rate, which contributes significantly to the increase in the composite hazard rate as illustrated by curve 1102. Thus, these failure mechanisms are highly prominent for high capacity drives. In view of the fact that high capacity drives have more read/write heads and more disks per drive than low capacity drives and consequently more opportunities for defects per drive it would be expected that a high capacity drive would probably have an increased hazard rate.

In addition to drive capacity being used as a subpopulation category, other subpopulations of the disk drives can be created while remaining within the scope of the present invention. For example, a disk drives that have undergone a firmware upgrade or change may be in a subpopulation, and disk drives that are working under a new or upgraded operating system software version may be another subpopulation.

It should be understood by those skilled in the art that the results of the analyses conducted in accordance with the present invention illustrate that disk drive reliability is highly dependent upon the manufacturer and family of disk drives. Prevalent causes of failure can be identified and addressed. These analyses can be used to work with the vendor to identify the magnitude of the problem and to provide corrective action, when necessary.

The foregoing has been a detailed description of the invention. Various modifications and additions can be made without departing from the spirit and scope of the invention. Furthermore, it is expressly contemplated that the various processes, layers and utilities shown and described according to this invention can be implemented as software, consisting of a computer-readable medium including program instructions executing on a computer, as hardware or firmware using state machines and the like, or as a combination of hardware, software and firmware. Accordingly, this description is meant to be taken only by way of example and not to otherwise limit the scope of the invention.

What is claimed is:

1. A method of performing reliability analysis in disk drives in an installation base comprising the steps of:
   recording identification information about each disk drive in a family of disk drives in the installation base;
   recording error codes that are generated by the disk drives operating in the installation base;
   creating a reliability database including mapping each recorded error code with a particular drive family;
   adding to said reliability database further information from a drive manufacturer about failure mechanisms associated with one or more error codes; and
   retrieving one or more error codes reported for a disk drive family during a time period, and matching the retrieved error codes with one or more failure mechanisms for that drive family.

2. The method of performing reliability analysis in disk drives as defined in claim 1 including the further step of calculating rates of change of failure indicators including error codes, failure modes and failure mechanisms and determining whether a rate of change of one or more of said failure indicators is increasing, decreasing or remaining constant.

3. The method of performing reliability analysis in disk drives as defined in claim 1 including the further step of plotting a hazard rate of one or more failure indicators including error codes, failure modes and failure mechanisms for a particular drive family.

4. The method of performing reliability analysis in disk drives as defined in claim 1 including the further step of plotting a hazard rate by first performing one or more data analysis techniques on retrieved error code data, or failure indicators including maximum likelihood estimates, goodness of fit tests, statistical distributions and/or curve fitting techniques to generate a linear plot of hazard rates.

5. The method of performing reliability analysis in disk drives as defined in claim 1 including dividing a disk drive family into subpopulations based upon predetermined conditions or events.

6. The method of performing reliability analysis in disk drives as defined in claim 5, including using drive capacity as a subpopulation.

7. The method of performing reliability analysis in disk drives as defined in claim 6 including the further steps of selecting drives of a low capacity from a particular drive family and analyzing one or more failure indicators for low capacity drives occurring in a given time period, and selecting drives of a high capacity from that particular drive family and analyzing one or more failure indicators for high capacity drives over the same time period.

8. The method of performing reliability analysis in disk drives as defined in claim 5 including the further step of plotting a hazard rate of one or more failure indicators for one or more of said subpopulations of disk drives.

9. A method of performing reliability analysis in disk drives in an installation base comprising the steps of:
recording identification information about each disk drive in a family of disk drives in the installation base:
recording error codes that are generated by the disk drives operating in the installation base;
creating a reliability database including mapping each recorded error code with a particular drive family;
adding to said reliability database further information from a drive manufacturer about failure mechanisms associated with one or more error codes;
retrieving one or more error codes reported for a disk drive family during a time period, and matching the retrieved error codes with one or more failure mechanisms for that drive family; and
dividing a disk drive family into subpopulations based upon predetermined conditions or events using disk drives that have undergone an upgrade or a new firmware version as a subpopulation.

10. A method of performing reliability analysis in disk drives in an installation base comprising the steps of:
recording identification information about each disk drive in a family of disk drives in the installation base;
recording error codes that are generated by the disk drives operating in the installation base;
creating a reliability database including mapping each recorded error code with a particular drive family;
adding to said reliability database further information from a drive manufacturer about failure mechanisms associated with one or more error codes;
retrieving one or more error codes reported for a disk drive family during a time period, and matching the retrieved error codes with one or more failure mechanisms for that drive family; and
dividing a disk drive family into subpopulations based upon predetermined conditions or events using disk drives are operating under a new or upgraded operating system software version as a subpopulation.

11. A system configured to perform reliability analysis on disk drives, comprising:
(A) a reliability database configured to store:
(i) information about each drive in a particular drive family;
(ii) error information including a failure mechanism associated with each error code from each drive family;
(iii) a mapping between individual error codes received, and drives within a drive family; and
(B) a reliability analysis utility configured to extract data from said reliability database and to construct one or more hazard rate plots of failure indicators associated with particular drive families.

12. A system adapted to perform reliability analysis on disk drives, comprising:
(A) a storage system adapted to execute an autosupport utility that is adapted to forward error code information generated about disk drives associated with the storage system to a storage system administrator;
(B) a reliability analysis utility adapted to receive and parse said error code information and to perform a reliability analysis thereupon; and
(C) a graphical user interface adapted to display a representation of said reliability analysis.

13. The system as defined in claim 12 wherein said reliability analysis includes computation of one or more hazard rates for error code information about selected disk drives and said graphical user interface is adapted to display a hazard rate plot for one or more of said hazard rates.

14. The system as defined in claim 12 further comprising an error log associated with said storage system and wherein said autosupport utility periodically retrieves error code information from said error log of said storage system and forwards retrieved error code information to the storage system administrator.

15. The system as defined in claim 12 further comprising an error log associated with said storage system and said autosupport utility is adapted to poll said error log to retrieve updated error code information and said autosupport utility forwards updated error code information to the storage system administrator.

16. The system as defined in claim 12 wherein said reliability analysis utility is further adapted to perform a one-to-one mapping using a disk drive serial number to retrieve information from an associated error code database, and from an associated storage information database, which is unique and common to both databases, and stores this information in a reliability database.

17. The system as defined in claim 16 wherein said reliability analysis utility uses information in said reliability database to analyze failure indicators occurring with respect to particular disk drive families associated with the system.

18. A system configured to perform reliability analysis on disk drive failures indicators comprising:
means for reporting error codes that are generated by disk drives in said field installation;

means for extracting information about an individual disk drive family and error codes reported on drives in that drive family over a time period;

means for analyzing failure indicators associated with said reported error codes about said individual drive family including means for generating a hazard rate plot of one or more failure indicators over a time period.

19. A computer readable medium for performing reliability analysis on disk drive failure indicators, including program instructions for performing the steps of:

generating a reliability database containing information regarding disk drive identity information and error log information stored in an associated computer;

selecting a particular drive family to study;

extracting from said reliability database one or more error codes representing failure indicators about a particular drive or drive family which have been received over a time period.

20. The computer readable medium for performing reliability analysis on disk drive failure indicators as defined in claim 19 including programming instructions for performing the further step of plotting one or more hazard rates for one or more failure indicators that have occurred over a time period for that particular drive family.

21. The computer readable medium for performing reliability analysis on disk drive failure indicators as defined in claim 19 including programming instructions for performing the further step of mapping a particular error code from a disk drive with the drive family to which the particular disk drive belongs by performing a one-to-one mapping using a disk drive serial number which is unique and common to both databases, and stores this information in said reliability database.

22. The computer readable medium for performing reliability analysis on disk drive failure indicators as defined in claim 19 including programming instructions for performing the further step of mapping the particular error code determined to be from a disk drive with a drive family to a specific failure mode or failure mechanism.

23. A method of performing reliability analysis in disk drive failure indicators comprising:

generating a reliability database containing information regarding disk drive identity information and error log information stored in an associated computer;

selecting a particular drive family to study from the reliability database; and extracting from said reliability database one or more error codes representing failure indicators about the particular drive family which have been received over a time period.

24. The method of performing reliability analysis in disk drive failure indicators as defined in claim 23, further comprising:

dividing a disk drive family into subpopulations based upon predetermined conditions or events.

25. The method of performing reliability analysis in disk drive failure indicators as defined in claim 24, further comprising:

plotting a hazard rate of one or more failure indicators for one or more of said subpopulations of disk drives.

26. A system of performing reliability analysis in disk drive failure indicators comprising:

means for generating a reliability database containing information regarding disk drive identity information and error log information stored in an associated computer;

means for selecting a particular drive family to study from the reliability database; and means for extracting from said reliability database one or more error codes representing failure indicators about the particular drive family which have been received over a time period.

27. The system of performing reliability analysis in disk drive failure indicators as defined in claim 26 further comprising:

means for dividing a disk drive family into subpopulations based upon predetermined conditions or events.

28. The system of performing reliability analysis in disk drive failure indicators as defined in claim 27, further comprising:

means for plotting a hazard rate of one or more failure indicators for one or more of said subpopulations of disk drives.

29. A system of performing reliability analysis in disk drive failure indicators comprising:

a reliability database containing information regarding disk drive identity information and error log information stored in an associated computer;

a reliability analysis utility configured to select a particular drive family to study from the reliability database; and the reliability analysis utility further configured to extract from the reliability database one or more error codes representing failure indicators about the particular drive family which have been received over a time period.

* * * * *